United States Patent Office

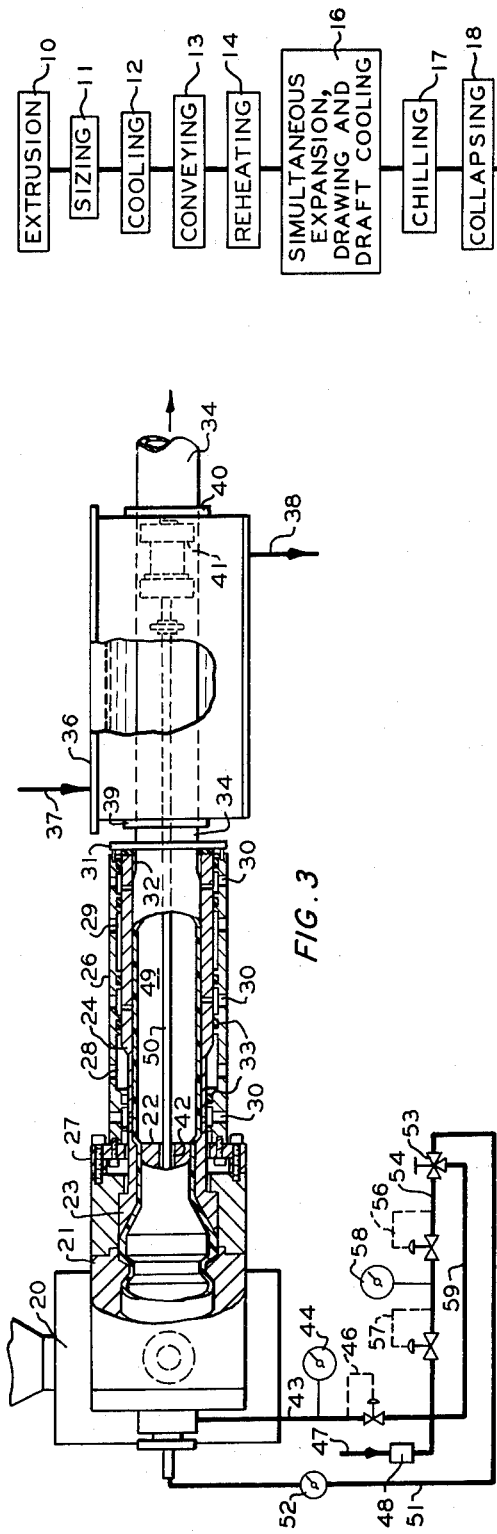
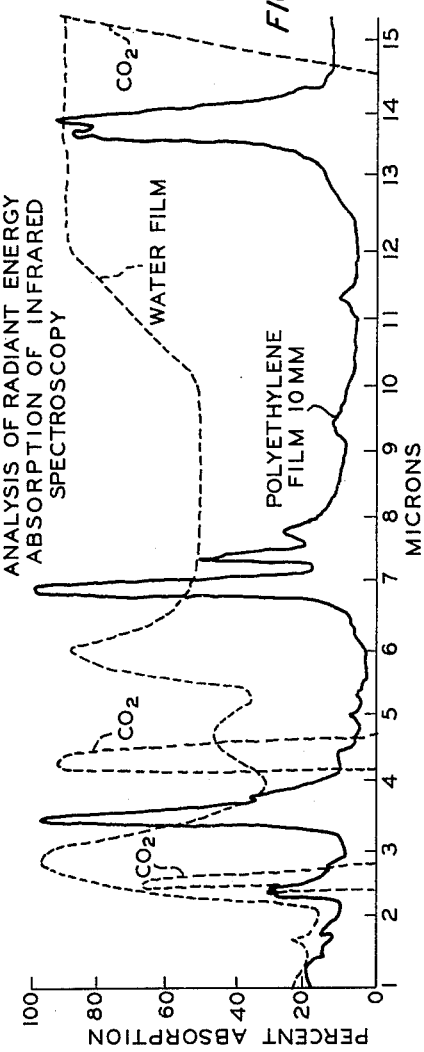

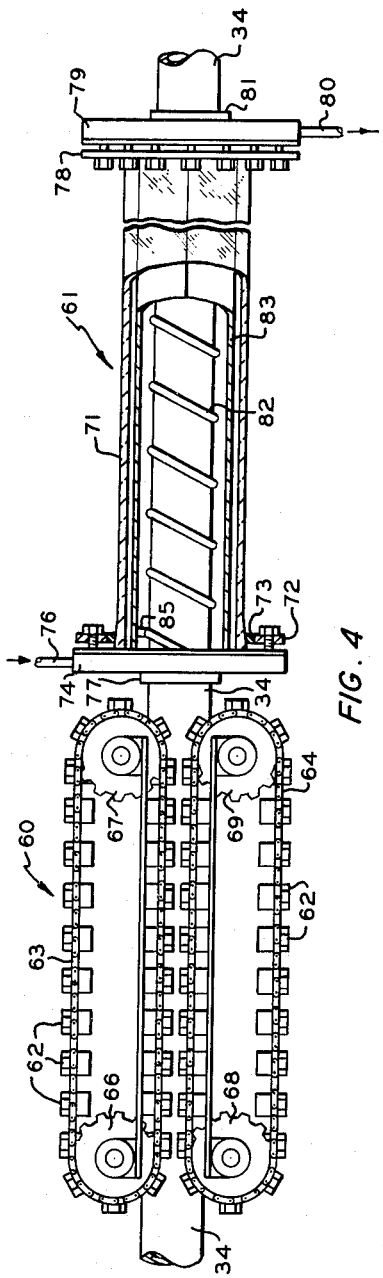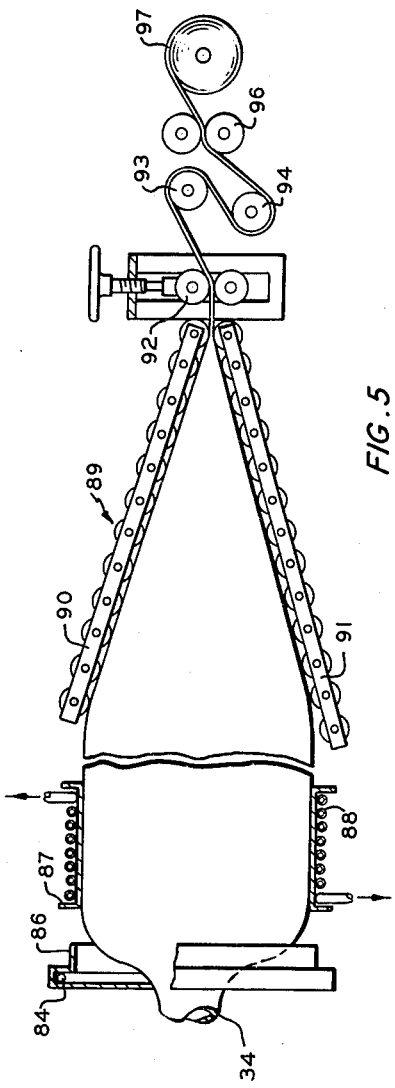

3,213,165
Patented Oct. 19, 1965

3,213,165
PROCESS OF RADIANT HEATING TUBULAR BODIES THROUGH ABSORBING GASES
Lyle W. Pollock, Bartlesville, Okla., assignor to Phillips Petroleum Company, a corporation of Delaware
Filed Sept. 17, 1962, Ser. No. 223,998
12 Claims. (Cl. 264—25)

This invention relates to the heating of elongated tubular bodies by radiant energy. In one aspect the invention relates to the forming of biaxially oriented tubular films from a crystalline thermoplastic material.

Although this invention is broadly applicable to the heating of any thin walled elongated tubular body, the discussion will be simplified by limiting the discussion to tubular films of a crystalline thermoplastic material.

It is well known that molecular orientation of various crystalline thermoplastic polymers in the form of sheets, films, filaments, tapes, tubes, pipe or the like increases the tensile strength of these structures. This orientation is commonly brought about by stretching the polymeric structure after formation thereof. This stretching should be carried out at temperatures sufficiently low that the polymer is in a substantially crystalline condition, otherwise, if the temperature of the polymer is sufficiently high that substantially all of the crystallites have melted, very little orientation occurs when the structure is stretched. Numerous methods have developed for the continuous production of oriented polymeric structures by extruding the polymer in the shape desired, subsequently cooling it to a temperature below the temperature required for the formation of crystals, and thereafter stretching the structure by placing it under tension. Biaxial orientation can be brought about by stretching the sheet or film first in one direction and then in a second direction at approximately right angles to the direction of the initial stretch. This sequential stretching is not desirable for many materials, particularly the crystallizable olefin polymers such as polyethylene, polypropylene and the like, since the beneficial results obtained in the initial stretch are considerably diminished by the second step of the orientation. Simultaneous biaxial stretching is desirable for the production of biaxially oriented films of these polymers.

It has been found that the biaxially oriented films presently available are not necessarily satisfactory for heavy packaging needs, for example, as bag materials for both chemical and food products. Because films of olefin polymers are substantially impervious to moisture and highly resistant to chemicals, bags formed from these films are well suited for the storage and shipping of chemicals, such as fertilizers like ammonium nitrate or ammonium sulfate. These materials are commonly packaged in bags of 40, 80 or 100 pounds and are inevitably subjected to rough handling before the product is used by the consumer. Such bags are most likely to fail when subjected to shock or heavy impact which produce stresses which cannot be readily dissipated, thereby causing the bag wall to rupture.

One of the difficulties previously encountered in the biaxial orientation of the film is the uniform heating of the tube prior to expansion. Heretofore, this heat treatment, which is conducted at a temperature just below the crystallization point of the crystalline thermoplastic material, has been accomplished in glycol bath so as to obtain a flat temperature gradient throughout the tube. Air is employed to mold the film. The employment of a liquid medium, such as glycol, for heat transfer produces some difficulties in that it is difficult to remove the glycol from the film which may result in difficulties in the subsequent equipment handling mechanisms such as pulleys and the like.

It is an object of this invention to provide a method for the heating of an elongated tubular body.

Another object of the invention is to provide a method for the formation of a biaxially oriented tubular film of a crystalline thermoplastic material.

These and other objects, advantages and features of my invention will be apparent to those skilled in the art from the following discussion, appended claims and drawings.

These objects are broadly accomplished by heating the exterior of an elongated tubular body by a source of radiant energy, and contacting both the interior and exterior surfaces of said tubular body with a gas which has an absorption maximum for radiant energy at a different wave length than said tubular body, said gas transferring heat from said radiant energy source to said body by convection.

In one aspect of the invention a biaxially oriented tubular film of crystalline thermoplastic material is formed by extruding said thermoplastic material at a temperature above its softening point in the form of an elongated tubular film, introducing a gaseous material into the interior of said tube as hereinafter described, cooling said tube, reheating said tube to a temperature within a few degrees below the polymer crystalline melting point by externally applied energy transferred by radiation of the heating zone, contacting the exterior surface of said tube with a gaseous material, said gaseous materials which are in contact with the interior and exterior surfaces being selected as hereinafter described, thereafter stretching said tube biaxially by simultaneous radial expansion and linear extension and cooling to set said orientation.

These objects are broadly accomplished by apparatus for producing a biaxially oriented film of crystalline thermoplastic material comprising, in combination, an extrusion means including a tubing die, a sizing and cooling sleeve attached to said die, a cooling bath positioned to receive the extruded tube from said sleeve, means for pulling said tube through said sleeve and cooling bath, an enclosed heating means positioned downstream from said cooling means, means for heating exteriorly said tube by energy transferred by radiation, means for introducing a gaseous material into the resulting annulus between said tube and the interior surface of said heating means, means for introducing a pressurized gas inside said tube, said gases serving to heat said tube by convection means in order to bring the tube to orientation temperature with the gas in the interior of said tube additionally serving to inflate said tube as it issues from said heating bath, means for collapsing and pulling said inflated tube in order to stretch the tube lengthwise as it issues from said heating bath, and means for chilling said inflated and stretched tube in order to set the orientation prior to collapsing the tube.

This invention can advantageously employ any thermoplastic polymer, such as polyvinylidine chloride, nylon, polyethylene glycol terephthalate, polystyrene, polyvinylchloride, polyvinyl acetate, polymethylmethacrylate, polyethylene, natural rubber, rubber hydrochlorides, chlorinated rubbers, butyl rubbers, polybutadiene, GRS rubbers, thiokol rubbers, or the like. For a study of the absorptive characteristics of polymers reference is made to "Analysis of Polymers by Infrared Spectroscopy" by H. H. Hausdorff, presented at the Pittsbugh Conference on Analytical Chemistry and Applied Spectroscopy, March 7, 1951. It is a particular advantage in the heating of tubular, thin-walled films of the highly crystalline olefin polymers, such as polyethylene, polypropylene, poly-1-butene, poly-4-methypentene-1 and other homopolymers and copolymers of similar mono-1-olefins containing up to 8 carbon atoms per molecule. I prefer to practice the invention with the more crystalline olefin polymers, for example those having a degree of crystallinity of at least 70 and more, preferably at least 80 percent at 25° C. Examples of such polymers are crystalline polypropylene and polybutenes and the high density ethylene polymers, particularly the homopolymers of ethylene or propylene and copolymers of ethylene or propylene with higher mono-1-olefins, these polymers having a density of about 0.940 to 0.990 gms./cc. at 25° C. As used herein the term "density" refers to the weight/unit volume (grams/cubic centimeter) of the polymer at 25° C. The density of polymer should be determined while the sample of the polymer is at thermal and phase equilibrium. In order to insure this equilibrium it is desirable to heat the sample to a temperature 15 to 25 centigrade degrees above its melting point and allow the sample to cool at a rate of about 2 centigrade degrees per minute to the temperature at which the density is to be measured. Any standard method for determining the density of a solid can be used. The crystallinity of the olefin polymers can be determined by X-ray diffraction or nuclear magnetic resonance. Prior to the determination of crystallinity it is desirable that the sample of the polymer be treated for thermal equillibration in a manner described in connection with the density determination.

The higher crystalline olefin polymers referred to above do not have a single freezing and melting point but instead have a crystalline freezing point at which maximum crystalline formation occurs upon cooling of the molten polymer and a separate crystalline melting point at which evidence of crystallinity disappears upon heating a sample of the polymer from a cooled crystalline condition. Ordinarily the latter temperature is several degrees above the crystalline freezing point. The crystalline freezing point of these polymers can be determined by melting a sample of the polymer, inserting a thermocouple in the molten polymer and allowing the polymer to cool slowly. The temperature is recorded and plotted on a chart versus time. The crystalline freezing point is the first plateau in the time-versus-temperature curve. For polyethylene having a density of about 0.960 the the crystalline freezing point is about 252° F. The crystalline melting point of these polymers can be determined by freezing a small piece of plastic (usually film) under crossed polaroids in a microscope equipped with means for heating the polymer. The specimen is heated slowly and the melting point is the temperature at which birefringence disappears. For polyethylene having a density of about 0.960 the crystalline melting point is ordinarily about 272° F.

The optimum temperature for orientation is the highest temperature which can be achieved while the resin mass is still in a substantially crystalline condition. This temperature will vary depending upon the polymer used and its crystalline melting point. For high density solution type polyethylene the temperature range is preferably 255–270° F., more preferably 260–270° F. For polypropylene the preferred range is 298–314° F. For ease of control it is desirable that this temperature be approached from below by heating a film of the polymer which is in a substantially uniform crystalline state. Nonuniformity in the crystalline condition of the polymer makes it difficult to stretch the tube so that a film of uniform gauge is obtained. In the continuous production of the film, therefore, I desire to form the tube, cool it to a crystalline state and then reheat it to the orientation temperature. This sequence of operations is illustrated in FIGURE 1.

It has now been discovered that the optimum temperature for orientation may be attained and maintained by enclosing the tube with a source of energy transmitted by radiation while passing through the annulus between the tube and the radiant heating means, as well as through the interior, gaseous materials such as carbon dioxide and steam which will selectively absorb wave lengths of radiant energy different than the wave lengths absorbed by the film. For example, when heating a tubular film of polyethylene it has been found that said film selectively absorbs radiant energy having wave lengths in the range of three to four microns, about 3.5, whereas steam selectively absorbs radiant energy having wave lengths below that of the polyethylene with its peak absorption band being slightly less than 3.0 while $CO_2$ selectively absorbs higher frequencies having a wave length in the range of 4.2 to 4.5 microns as well as wave lengths in the range of 2.5 to 3.0. Therefore, when employing a source of black body radiation or any source of radiation having wave lengths in the range of less than 5 microns, preferably 2 to 5 microns, the energy transmitted by the source toward the exterior of the tubular film must first pass through the annulus containing the selected gases, such as a mixture of $CO_2$ and water vapor or steam. The gases passing through the annulus between the tubular film and the radiant heating means absorb selected wave lengths and are thus heated to an elevated temperature, thus, making available energy transferable by convection. Thus, not only is the tubular film heated by direct radiation by those wave lengths which are not absorbed by the gases but are absorbable by the film, but the thus heated gases then transmit additional heat to the film by convection. The term "convection" as herein defined includes the transfer of heat to a solid body from a gaseous material having thermal energies above those of said solid body by means other than radiation. This term is sometimes referred to by those skilled in the art as convection-conduction or simply conduction. In addition, that energy transmitted by radiation, but not absorbed by the gases exterior of the tube nor absorbed by the tube, passes through the tube and heats by energy transmitted by radiation the gases in the interior of the tube. These gases in turn heat the tube by convection.

Although this invention is discussed with primary emphasis on the employment of a mixture of $CO_2$ and water vapor or steam, it is within the scope of the invention to employ either $CO_2$ or water vapor in either the exterior or interior of said tube. In addition it is within the scope of the invention to employ any gas or combination of gases selectively absorbing different wave lengths transmitted by radiation than those absorbed by the tubular film. Preferably the gas or combination of gases in contact with the exterior of the surface of said tube does not selectively absorb, as the major portion of its energy, those wave lengths absorbed by the gas or combination of gases in contact with the interior surface of said tube. For a discussion of the absorption bands for gases reference is made to "Catalog of Infrared Spectra for Qualitative Analysis of Gases" by R. H. Pierson et al., pp. 1218–1239 Analytical Chemistry, August 1956. Although it will be seen that $CO_2$ has almost ideal absorptive characteristics for a polyhydrocarbon, other suitable gases include acetylene, ammonia, hydrogen cyanide, nitrous oxide, phosgene, sulfur dioxide, carbon monoxide and nitric oxide. In view of toxicity of some of these gases and others which have absorptive bands, carbon dioxide or carbon dioxide plus water vapor and/or steam is generally preferred. For a study of how the absorptive bands of $CO_2$, water and polyethylene compare reference is made to FIGURE 2. Although the drawing illustrates a water film compared to polyethylene and $CO_2$ the absorptive band for water vapor and steam are essentially the same as the water film, but shifted slightly to the left. Since a comparative band for steam and water vapor is difficultly obtainable the drawing is sufficient for illustrative purposes. Although any source of radiant energy may be employed, it is generally preferred to employ a source transmitting as the bulk of its energy wave lengths in the range of less than 5 microns, preferably in the range of 2 to 5 microns, since generally energies at this level are appreciably higher than the energies in the longer wave lengths.

The invention will be illustrated by reference to the accompanying drawings in which:

FIGURE 1 is a flow sheet of the process of the invention;

FIGURE 2 is a graphical presentation of the analysis of radiant energy absorption infrared spectroscopic and a comparison of the absorption of $CO_2$, water film, and polyethylene film;

FIGURE 3 is an elevation view of the extrusion, sizing and cooling stages of the operation;

FIGURE 4 is an elevation view of the contoured jaw puller and heating zone used in the operation;

FIGURE 5 is an elevation of the inflation and stretching apparatus used in the operation.

The sequence of operation is best illustrated in FIGURE 1.

A tube of thermoplastic material, such as polyethylene, of the desired diameter and wall thickness is formed in extrusion step 10 from the polymer melt. Extrusion temperatures will vary considerably depending upon the polymer used. For example, for polymers such as high density polyethylene or polypropylene extrusion temperatures of about 350 to 400° F. are frequently employed. The tube having a predetermined diameter and wall thickness issues from the extruder die and passes immediately into a sizing sleeve where it is cooled by indirect heat exchange with a cooling liquid and at the same time stretched slightly to produce the desired wall thickness. In the sizing operation at least the surface of the tube is cooled to a substantially crystalline condition, generally at least several degrees below the crystalline freezing point of the polymer. With the high density ethylene polymers, at least the surface of the tube is cooled to below about 250° F. Since it is necessary to insure that all of the polymer in the tube is in substantially uniform crystalline condition, the tube is then passed to a cooling step 12 where it is placed in direct heat exchange with a cooling liquid for a sufficient period of time to cool all of the polymer in the tube below the crystalline freezing point. Ordinarily the tube is further cooled in this operation to temperatures of about 210° F. or below. The cooled tube then passes to conveying operation 13 which employs a positive-grip conveying means which pulls the tube through the sizing and cooling steps at a rate slightly faster than the extrusion rate. In this way the wall thickness of the tube can be controlled within relatively narrow limits.

Conveying operation 13 not only pulls the tube through sizing and cooling steps 11 and 12 but also pushes the tube into reheating step 14. The reheating step brings the tube to the proper orientation temperature, which as pointed out previously, is within a few degrees below the crystalline melting point of the polymer as the tube issues from reheating step 14 it is subjected to step 16 which includes simultaneous expansion and drawing in combination with the draft cooling. In operation 16 the tube of polymer is simultaneously stretched in the machine and transverse direction while at the same time it is subjected to a cooling gradient so that the temperature of the tube when it reaches its final diameter is several degrees below the temperature of the tube as it issues from reheating step 14. This cooling gradient has been found essential in the production of films of crystalline olefin polymers having a predetermined balance of properties, for example, equal elongation properties in both the machine and transverse directions. After the tube has been expanded to its desired diameter it is immediately chilled in step 17 to reduce the temperature of the polymer to substantially below its orientation temperature so that no further stretching takes place in either the machine or transverse directions. The expanded and chilled tube is then collapsed in step 18 to form a two layer film which can then be wound up on a reel in step 19.

Having thus described the overall operation in a general fashion attention is now given to the individual features, referring first to FIGURE 3 which is an elevational view of the extrusion, sizing and cooling stages of the operation. Molten polymer is fed in the conventional manner by extruder 20 to crosshead die 21. Crosshead die 21 is equipped with a mandrel 22 and die 23 which together define an annular orifice through which the molten polymer is extruded in the form of a tube. The diameter and thickness of the tube thus extruded depends upon the desired size and the thickness of the expanded and oriented tube and the degree of drawdown and expansion required to produce the desired physical properties.

As the tube issues from the die it passes immediately into cooling and sizing sleeve 24 which with jacket 26 is attached through collar 27 to die head 21. Jacket 26 defines annular chambers 28 and 29 through which cooling liquid can be circulated in indirect heat exchange relationship with the tube passing through sleeve 24. In order to facilitate the operation on start-up and to insure that the tube makes close contact with the walls of sleeve 24, a plurality of vacuum ports 30 are provided with numerous holes connecting the ports to the space between tube wall and the cooling sleeve. Since there is usually a slight tendency of the tube to shrink as it is cooled, flange 31 with seal ring 32 is provided to seal the space between the tube wall and the cooling sleeve thereby preventing loss of the vacuum. A plurality of O-rings 33 are provided between the jacket and the cooling sleeve in order to seal the annular spaces used for vacuum and cooling liquid.

By the time tube 34 leaves the cooling sleeve it has been sufficiently cooled on the surface that it can be further cooled by a direct heat exchange with a cooling liquid. Tube 34 then passes directly into water bath 36 through which water is circulated via inlet 37 and outlet 38. Flexible seals 39 and 40 at the entrance and exit, respectively, of water bath 36 prevent the water from being lost from the tank. Thus, the tube 34 is formed having the desired dimensions and with the polymer therein in uniform crystalline condition. In the manufacture of film for heavy bag material the tube will ordinarily have a diameter of about 2 to 6 inches and a thickness in the range of about 30 to 70 mils.

Once the operation has been started and is on a continuous basis the gauge uniformity of the tube can be improved by employing relatively high internal pressures within the tube while it is in the cooling and sizing sleeve. Since relatively low pressures are necessary for the expansion of the tube during the orientation process, I have provided the apparatus shown in FIGURE 3 so that two distinct pressure zones can be maintained within the tube: an upstream high pressure zone for expanding the tube slightly against the walls of the sizing sleeve, a downstream low pressure zone used for the orientation process. These two zones are maintained by seal 41 which is positioned within the tube downstream from the sizing sleeve but upstream from the reheating operation. Conduit 42 passes axially through cross head die 21 and is connected to line 43. Line 43 contains pressure gauge 44 and pressure regulator 46 and is connected to a source of gases such as $CO_2$ or water vapor or steam or combinations thereof, through conduit 47 and filter 48. Ordinarily a pressure in the range of about 10 to 30 pounds per square inch gauge will be satisfactory for the purpose of expanding the tube against the walls of sizing sleeve.

Conduit 42 is in open communication with the upstream zone 49 within the tube between mandrel 22 and seal 41. Seal 41 prevents the high pressure within zone 49 from being transmitted to the volume within the tube downstream from seal 41. Conduit 50 passes through seal 41 and axially through conduit 42. Conduit 50 communicates with the zone within the tube downstream from seal 41 and is connected through line 51 containing pressure gauge 52 to three-way valve 53. During normal operation line 51 is connected through valve 53 to line 54 carrying pressure regulators 56 and 57 and pressure gauge 58. Conduit 54 is also connected through line 47 to the high pressure air source but the pressure within line 54 at the three-way valve 53 is reduced to about 1 to 3 pounds per square inch gauge by regulators 56 and 57. Thus the pressure within zone 49 can be maintained at about 10 to 30 pounds per square inch for the purpose of sizing the tube in cooling sleeve 24 while the pressure for the orientation operation is maintained much lower, for example about 1 to 3 pounds per square inch gauge. Where higher pressures are needed for initially expanding the tube in starting up the orientation process, three-way valve 53 is provided so that line 51 can be manually connected to the high pressure air source through line 59. It is within the scope of the invention to employ a different gas or different combination of gases for the high pressure as compared to the low pressure gas, but this frequently will unduly complicate procedures and make sealing difficult.

The gas or combination of gases employed may come from any convenient source but when a mixture of $CO_2$ and water vapor is desired, it is frequently most convenient to use the combustion products of a hydrocarbon fuel such as methane.

Referring now to FIGURE 4, a contoured jaw tube puller 60 is shown for the purpose of pulling the tube from the cooling sleeve and through the water bath and pushing the tube into the heating bath or zone 61. The speed of tube puller 60 is regulated so that the tube is pulled from the sizing sleeve slightly faster than the rate at which the tube is extruded from the die. The slight tension which is placed on the tube within the sizing sleeve causes a small reduction in tube thickness immediately after the tube is extracted and before it is cooled and thereby improves the gauge uniformity of the tube. Tube puller 60 is provided with a plurality of contoured jaws 62 mounted in upper and lower chain sets 63 and 64, respectively. Chain set 63 is driven by sprocket wheels 66 which in turn are powered by a variable speed motor not shown. Chain set 63 also turns on idler sprocket wheels 67. Chain set 64 is driven by sprocket wheels 68 which are geared to sprocket wheels 66. Chain set 64 also turns over idler sprocket wheels 69. As chain sets 63 and 64 are rotated the contour jaws 62 close about the tube 34 gripping it firmly but without deformation and advance it from the water bath into the heating bath 61. In order to prevent slipping and deformation of the tube resilient pads (not shown) are provided in each of the contour jaws.

Referring again to FIGURE 4, polymer film, which is in a relatively cool uniform crystalline condition, is passed by tube puller 60 into heating bath 61. Heating bath 61 comprises an elongated cylindrical shell 71. Shell 71 is fastened at one end by flange 72 having a resilient ring portion 73 to head member 74. Head member 74 is equipped with a gas inlet 76 and a gas seal 77 made of rubber or Teflon. This seal prevents the gas, which is preferably a mixture of $CO_2$ and water vapor, or steam, from leaking or escaping at the point at which the tube 34 enters the heating bath. In a similar manner the shell 71 is attached at its other end by flange 78 to head member 79 which is equipped with the gas outlet 80 and a gas seal 81. A seal ring of polytetrafluoroethylene is preferred for this service. These gases may be recycled to conduit 47 or conduit 76. One of the advantages of this system is that only a very low or no flow of gas is necessary and little recycle is necessary. The inside diameter of shell 71 is larger than the outside diameter of tube 34 with the tube 34 being supported within the shell by helical rod 82. Rod 82 can be formed from metal and coated with polytetrafluoroethylene in order to reduce friction between the rod and the outside of the tube. The helix is attached to the walls of shell 71 by supports 85. A source of radiant energy such as a radiant heater 83 is positioned in the annulus between the shell 71 and the helix 82 for the purpose of transmitting energy by radiation through said annulus, the interior of said tube and said tube itself.

Another very important advantage accrues from the use of the helical shaped guide rod. This rod tends to act like a spring and compress slightly on occasions when the tube starts to buckle within the heating bath. This slight compression of the guide rod prevents what would otherwise become a serious block-up in the heating bath requiring complete shut-down of the operation. The situation frequently corrects itself or corrective action can be taken during the delay provided by the compression of the guide rod. During normal operation, the slight spring action of the helix serves to maintain the friction drag on the tube at a low constant value by a self regulating action. If friction were to increase slightly, the increased drag of the tube on the helix would give it a minute compression which minutely increases the inside diameter of the helix which in turn at once lowers the drag and the helix loses its compression and the normal condition is restored.

Because of the tendency of the tube to buckle, as described above, it is highly desirable to construct shell 71 from a transparent material such as Pyrex glass. By so doing the condition of the tube within the heating bath is clearly visible to an operator. There is frequently a tendency for the tube to block up within the heating bath, thereby necessitating the shut-down of the operation and repeating the involved start-up procedure. It has been discovered that these block-ups were caused by the tube buckling within the bath as a result of an imbalance between the rate at which the tube is forced into the bath and the rate at which it is withdrawn. By constructing the shell of a transparent material this tendency to buckle can be detected visually at a very early stage and the take-off rate can be increased slightly to avoid the problem.

The residence time of the tube within the heating zone must be sufficiently long that all of the polymer in the tube is brought to orientation temperature. This does not mean that the temperature of the tube need be uniform throughout but there should not be more than a few degrees, for example, 1 to 5° F., difference between the inside and the outside of the tube. Depending upon the operation, the length of heating zone 61 can be increased or, as is frequently desirable, a plurality of such heating baths can be used. From a practical standpoint, the length of the heating bath is limited by the friction between the tube and the guide rod. Necking of the tube within the bath must be avoided since otherwise the seal between seal ring 81 and the tube cannot be maintained and the heating gas will leak from the bath.

Referring now to FIGURE 5, tube 34 as it issues from the heating zone 61 is expanded by internal fluid pressure while at the same time it is stretched in a linear direction. The trapped bubble method of operation is not adequate here but the inflating gas must be in continuous supply and adequately pressured as described in connection with FIGURE 3. The ratio of the final to the initial diameter of the tube depends upon the properties desired in the finished product. When working with tubes of highly crystalline olefin polymers, a clear, strong film can be produced using relatively high blow-up ratios, for example, from about 7 to 1 to 10 to 1. However, the tough films which are most suitable for the production of bag material are made using much lower blow-up ratios, for example about 3 to 1 to 6 to 1 and preferably a blow-up ratio of about 4 times is employed. For balanced properties the amount of stretch in both the machine and transverse directions should be approximately equal. Some improvement in gauge uniformity can be obtained, however, if the machine direction stretch ratio is slightly higher than the transverse direction blow-up ratio.

The temperature at which the orientation is carried out is dependent upon the polymer employed. Using an ethylene polymer having a density of about 0.960 gms./cc. at 25° C., the orientation should be carried out at a temperature in the range of 260 to 270° F., preferably in about the middle of this range. Better gauge uniformity can thereby be obtained than when operating at somewhat lower temperatures. These temperatures refer to the temperature of the polymer immediately after it issues from the heating bath when stretching begins. Once stretching has started it will proceed satisfactorily at progressively lower temperatures. The best balance of properties can be obtained, therefore, by directing a cooling gas on the outside of the expanding tube so that the temperature of the tube decreases while it is undergoing the biaxial orientation. As shown in FIGURE 5, this cooling air is supplied tangentially at inlet 84 to open ring member 86 which is positioned immediately downstream from the heating bath 61 so that the tube must pass through ring 86 as it expands. In the absence of cooling gas supplied by ring member 86 there is a tendency of the temperature of the film undergoing biaxial orientation to rise because of the work being performed on it. Because the tube as it issues from the heating bath is immediately at orientation temperature there would apparently be no need to condition the tube further temperature-wise. The stretching takes place immediately after the tube issues from the heating bath so that this portion of the operation is carried out in a relatively short distance, for example, about 2 to 10 inches, depending upon the diameter to which the tube is inflated. Even though the ambient atmosphere is at a temperature far below that of the tube as it issues from the bath, no significant cooling of the tube occurs, in the absence of a direct effort to circulate cooling gas about the tube. The stagnant air film effectively insulates the expanding tube and, in any event, the heat loss to the surrounding atmosphere does little more than offset the heat generated within the tube as a result of the mechanical work performed on it. The production of a decrease in temperature along the tube as it expands was found to be essential to obtain the satisfactory balance of properties which is desired in bag materials.

After the tube has expanded to the desired diameter it passes into a final sleeve 87 where it is chilled by cooling liquid circulating through coils 88. Sleeve 87 is preferably aluminum with a chrome plate polished to a satin finish. The expanded tube is cooled sufficiently in sleeve 87 that further stretching is prevented in either direction. In place of cooling sleeve 87, jets of cooling gas and may be used to chill the tube to temperatures far below that necessary for orientation and thereby prevent further radial or longitudinal stretching. This final cooling step must not be confused with the cooling air impinged upon the expanding bubble by air ring 86. The cooling gas distributed by ring 86 produces a cooling gradient across the expanding tube but maintains the tube at orientation temperature. The cooling which is carried by sleeve 87 or equivalent means cools the tube after orientation has been completed and serves to set the orientation and prevent further expansion. Thus, the cooling functions illustrated in FIGURE 5 are independent and each serves a different purpose.

Expanded and oriented film which is to be used for bags will ordinarily have a thickness of about 1 to 5 mils and the diameter of the tube may vary from about 8 to 24 inches. Of course, other combinations of dimensions are possible and depend upon the use to which the film is put. The expanded and oriented film passes from chilling sleeve 87 to collapsing stand 89 which comprises upper and lower roller bearings 90 and 91, respectively, which converge towards pinch rolls 92. Pinch rolls 92 seal the expanding air within the tube and are power driven in order to place the necessary tension on the tube required for the longitudinal stretching and orientation. The speed of pinch rolls 92 is adjusted so that the take-off rate of the film is faster than the rate at which the tube issues from the heating bath 61. The ratio of these two speeds determines the machine direction stretch ratio. The collapsed tube then passes over idler rolls 93 and 94 and between a second set of pinch rolls 96 before it is taken upon on reel 97.

In order to illustrate further the advantages of my invention the following example is presented. The conditions given in this example should be interpreted as typical only and not construed to limit my invention unduly.

Polyethylene having a density of 0.960 grms./cc. and a melt index of 0.2 (ASTM-D-1$w$ 58T) is extruded at a temperature of 350° F. through a 1½ inch diameter die opening with an extruder screw speed of 22 r.p.m. The throughput of the extruder is 11 pounds per hour. The tube thus formed is passed through a sizing sleeve, cooled in a water bath to a temperature of 100° F. and passed into the radiant heating means in which the gases pass in contact with both the exterior and interior surfaces of the tube as described hereinbefore with reference to the drawing. An electrical radiant heater emitting essentially black body radiation operating at 900° F. is employed. The inlet temperature of the incoming make-up gases is about 260° F. with sufficient $CO_2$ and steam being added to make up losses due to leakage. The pressure of the gases on the interior and exterior of the tube is 3 p.s.i. so that the pressure prevents expanding and collapsing the tube. The polymer is thus heated to approximately 260° F. and then stretched biaxially by inflation and simultaneous tension to give a machine direction stretch ratio of 6.2/1 and a transverse direction stretch ratio of 4.3/1. The transverse direction stretch ratio is the ratio of the tube diameter to the diameter of the extruded tube. The machine direction stretch ratio is the ratio between the film wind-up speed and the speed of the tube upstream of the radiant heating means. The final film thickness is approximately 1.2 mils. Cooling air is distributed around the expanding bubble using an inlet air pressure 20 pounds per square inch gauge. The temperature of the cooling air is about 70° F.

While certain examples, structures, compositions and process steps have been described for purposes of illustration, the invention is not limited to these. Variation and modification within the scope of the disclosure and the claims can readily be effected by those skilled in the art.

I claim:

1. A process which comprises heating the exterior of an elongated tubular body by a source of radiant energy, and contacting both the interior and exterior surfaces of said body with a gas which as an absorption maximum for radiant energy at a different wave length than said tubular body, said interior gas selectively absorbing radiant energy of a wave length not absorbed by said exterior gas, said gases transferring heat from said radiant energy source to said tubular body by convection.

2. The process of claim 1 wherein said body comprises a polymer of an olefin and said gases are selected from the group consisting of carbon dioxide and steam.

3. A process for heating an elongated tubular body of a polymer of an olefin comprising subjecting said body to externally applied energy transferred by radiation in a heating zone and contacting an exterior surface of said body with a gaseous material containing steam and contacting the interior surface of said body with a gaseous material containing $CO_2$, said steam and $CO_2$ selectively absorbing, as a major portion of their absorbed energies radiant energy of a different wave length than absorbed by said tubular body thus making available energy in said gases transferable to said body by convection thereby exteriorly heating said body by transfer of energy by radiation and interiorly and exteriorly heating said body by transfer of energy by convection from an original source of energy by radiation.

4. The process of claim 1 wherein said polymer comprises a polymer of ethylene.

5. The process of claim 3 wherein said polymer comprises a polymer of propylene.

6. The process of heating an elongated tubular body of a polymer of an olefin selected from the group consisting of ethylene and propylene comprising subjecting said body to externally applied energy transferred by radiation in a heating zone, said radiant energy having a wave length in the range of 2 to 5 microns, and contacting the exterior and interior surfaces of said tubular body with a mixture of gases comprising steam and $CO_2$, said steam, polymer, and $CO_2$ selectively absorbing, as the major portion of their absorbed energies, radiant energy having wave lengths in the ranges of 2.0 to 3.0, 3.1 to 3.9, and 4.0 to 5.0 respectively, said heated gases thus absorbing energy transferable to said body by convection thereby exteriorly heating said tubular body by transfer of energy by radiation and exteriorly and interiorly heating said body by transfer of energy by convection from an original source of energy by radiation.

7. The process of claim 6, wherein said polymer comprises polyethylene having a density in the range of 0.940 to 0.99 gms./cc.

8. The process of claim 6 wherein said polymer comprises polypropylene.

9. A process for forming a biaxially oriented tubular film of a crystalline thermoplastic material, comprising extruding said thermoplastic material at a temperature above its softening point in the form of an elongated tubular film, introducing a gaseous material into the interior of said tube, cooling said tube, reheating said tube to a temperature within a few degrees below the polymer crystalline melting point by externally applied energy transferred by radiation in the heating zone, contacting the exterior surface of said tube with a gaseous material, said gaseous materials which are in contact with the interior and exterior surface of said tube being selected so as to selectively absorb, as the major portion of their absorbed energy, radiant energy of a different wave length than absorbed by said tubular body thus making available energy in said gases transferable to said body by convection thereby exteriorly heating said tubular body by transfer of energy by radiation and interiorly and exteriorly heating said body by transfer of energy by convection, from an original source of energy by radiation, thereafter stretching said tube biaxially by simultaneous radial expansion and linear extension and cooling to set the orientation.

10. A method for forming a biaxially oriented tubular film of a polymer of an olefin comprising extruding said polyolefin at a temperature above its softening point in the form of an elongated tubular film, introducing a gaseous material containing $CO_2$ into the interior of said tube, cooling said tube, reheating said tube to a temperature within a few degrees below the polymer crystalline melting point by externally applied energy transferred by radiation in a heating zone, contacting the exterior surface with a gaseous material containing steam, said gaseous materials which are in contact with the interior and the exterior surface of said tube selectively absorbing, as the major portion of their absorbed energies, radiant energy of a different wave length than absorbed by said tubular body and thus making available energy transferable to said body by convection and thereby exteriorly heating said tubular body by transfer of energy by radiation and interiorly and exteriorly heating said body by transfer of energy by convection from an original source of radiation, thereafter stretching said tube biaxially by simultaneous radial expansion and linear extension and cooling to set the orientation.

11. A method for forming a biaxially oriented tubular film of a polymer of an olefin selected from the group consisting of ethylene and propylene, comprising extruding said polymer at a temperature above its softening point in the form of an elongated tubular film, introducing a gaseous material containing $CO_2$ and steam into the interior of said tube at a pressure sufficient to expand said tube as hereinafter recited, cooling said tube, reheating said tube to a temperature within a few degrees of the polymer crystalline melting point by externally applied energy transferred by radiation in the heating zone, said radiant energy having a wave length in the range of 2 to 5 microns, and contacting the exterior of said tubular body with a mixture of gases comprising steam and $CO_2$, at a pressure sufficient to prevent expansion of said tube in said heating zone, said steam, polymer and $CO_2$ selectively absorbing, as a major portion of their absorbed energies, radiant energy having wave lengths in the range of 2.0 to 3.0, 3.1 to 3.9, and 4.0 to 5.0 respectively, said heated gases thus making available energy transferable to said body by convection thereby exteriorly heating said tubular body by transfer of energy by radiation and exteriorly and interiorly heating said body by transfer of energy by convection from an original source of energy by radiation, thereafter stretching said tube biaxially by simultaneous radial expansion and linear extension and cooling to set the orientation.

12. A process for forming a biaxially oriented film of ethylene polymer having a density at 25° C. of at least 0.940 gms./cc. which comprises extruding said polymer in the shape of a tube, immediately passing said tube through a sleeve wherein said tube is placed in indirect heat exchange with a circulating cooling fluid thereby cooling at least the surface of said tube to below about 250° F., forcing said tube by internal fluid against said sleeve, passing the thus chilled tube through a conditioning bath wherein said tube is placed in direct heat exchange with circulating cooling fluid bringing all the polymer in the tube to a substantially uniform condition at a temperature below 110° F., pulling said tube from said sleeve and through said bath at a rate slightly faster than the rate at which said tube is extruded, passing said tube through a heating zone wherein said tube is subjected to externally applied energy transferred by radiation, to heat said tube to a temperature in the range of 255 to 270° F., said radiant energy having a wave length in the range of 2 to 5 microns, and contacting the exterior and interior of said tubular body with a mixture of gases comprising steam and $CO_2$, said steam, polymer and $CO_2$ selectively absorbing, as a major portion of their absorbed energies, radiant energy having wave lengths in the ranges of 2.0 to 3.0, 3.1 and 4.0 to 5.0 respectively, said heated gases thus making available energy transferable to said body by convection thereby exteriorly heating said tubular body by transfer of energy by radiation and exteriorly and interiorly heating said body by transfer of energy by convection from an original source of energy by radiation, heating to orientation temperature below the crystalline melting point of the polymer, immediately expanding said tube as it issues from said heating bath with internal gas pressure to enlarge the diameter of said tube about 3 to 6 times, simultaneously stretching said tube longitudinally to increase the length about 3 to 6 times, directing a current of coolant gas into the outer surface of said tube during said simultaneous expanding and stretching so as to produce a cooling gradient on the outer surface of said tube during the transition from the initial diameter to final diameter of 6 to 20° F., chilling the enlarged tube to set the orientation and prevent further stretching, collapsing the chilled enlarged tube and winding up the collapsed tube at a rate necessary to produce said stretching.

(References on following page)

References Cited by the Examiner

UNITED STATES PATENTS

| | | | |
|---|---|---|---|
| 2,688,773 | 9/54 | McIntire | 264—95 |
| 2,716,777 | 9/55 | Hagen | 264—95 |
| 2,936,491 | 5/60 | Hamlin | 264—95 |
| 2,961,711 | 11/60 | Diedrich et al. | 264—95 |
| 3,108,851 | 10/63 | Hofer et al. | 264—209 |

FOREIGN PATENTS 524,777  8/40  Great Britain.

ROBERT F. WHITE, *Primary Examiner.*

ALEXANDER H. BRODMERKEL, *Examiner.*